United States Patent [19]
Munnoch et al.

[11] Patent Number: 5,947,490
[45] Date of Patent: *Sep. 7, 1999

[54] PEDESTRIAN OPERATED MACHINE WITH FOLDAWAY SEAT

[75] Inventors: Peter Alexander Clarence Munnoch, Alioa; Kenneth Michael Loasby, Flore; Thomas Dobbie Lockhart, Naseby, all of United Kingdom

[73] Assignee: Applied Sweepers Limited, Falkirk, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/651,781

[22] Filed: May 23, 1996

[30] Foreign Application Priority Data

May 26, 1995 [GB] United Kingdom .................. 9510701

[51] Int. Cl.⁶ ................................................. B62D 36/00
[52] U.S. Cl. .................... 280/32.7; 180/19.1; 180/19.3; 15/79.1; 15/340.2
[58] Field of Search .............................. 280/32.7, 479.3, 280/638; 180/19.1, 19.2, 19.3; 15/78, 79.1, 79.2, 340.1, 340.2; 56/1, 2, 16.7, DIG. 9, DIG. 14

[56] References Cited

U.S. PATENT DOCUMENTS

| | | | |
|---|---|---|---|
| 2,740,462 | 4/1956 | Stegeman | 180/19.1 |
| 3,099,462 | 7/1963 | Lent | 280/479.3 |
| 3,190,672 | 6/1965 | Swanson et al. | 280/32.7 |
| 3,336,042 | 8/1967 | Southall | 280/32.7 |
| 3,485,314 | 12/1969 | Herr | 280/32.7 |
| 3,491,399 | 1/1970 | Dolan et al. | |
| 3,665,545 | 5/1972 | Beekman | |
| 3,670,359 | 6/1972 | Gutbrod | |
| 3,708,823 | 1/1973 | Bell | |
| 3,813,725 | 6/1974 | Rinker | |
| 3,984,896 | 10/1976 | Hicks | |
| 4,096,920 | 6/1978 | Heyn | |
| 4,792,153 | 12/1988 | Galdes | 280/479.3 |
| 4,825,500 | 5/1989 | Basham et al. | |
| 4,828,282 | 5/1989 | Pinto | 280/32.7 |
| 4,998,948 | 3/1991 | Osterling | 280/32.7 |
| 5,004,251 | 4/1991 | Velke et al. | |
| 5,118,123 | 6/1992 | Betrock | 280/32.7 |
| 5,388,850 | 2/1995 | Simone | 180/19.1 |

FOREIGN PATENT DOCUMENTS

| | | |
|---|---|---|
| 2198930 | 4/1991 | United Kingdom . |
| 2271728 | 10/1993 | United Kingdom . |
| 2287418 | 3/1994 | United Kingdom . |

*Primary Examiner*—Daniel G. DePumpo
*Attorney, Agent, or Firm*—Cumpston & Shaw

[57] ABSTRACT

A seat assembly for a pedestrian operated machine may be pivotally attached to the rear of the machine at (22) and comprise a frame (20) having a spine (30) with a spine extension (31) supporting a seat (32) on a stalk (34) supported by a wheel (26). The spine extension is movable between a retracted pedestrian operated mode and an extended ride-on mode when the seat can be pivoted from a fold-away position to a position of use. When in its extended position the spine extension allows the frame to be pivoted about a vertical axis (40).

35 Claims, 8 Drawing Sheets

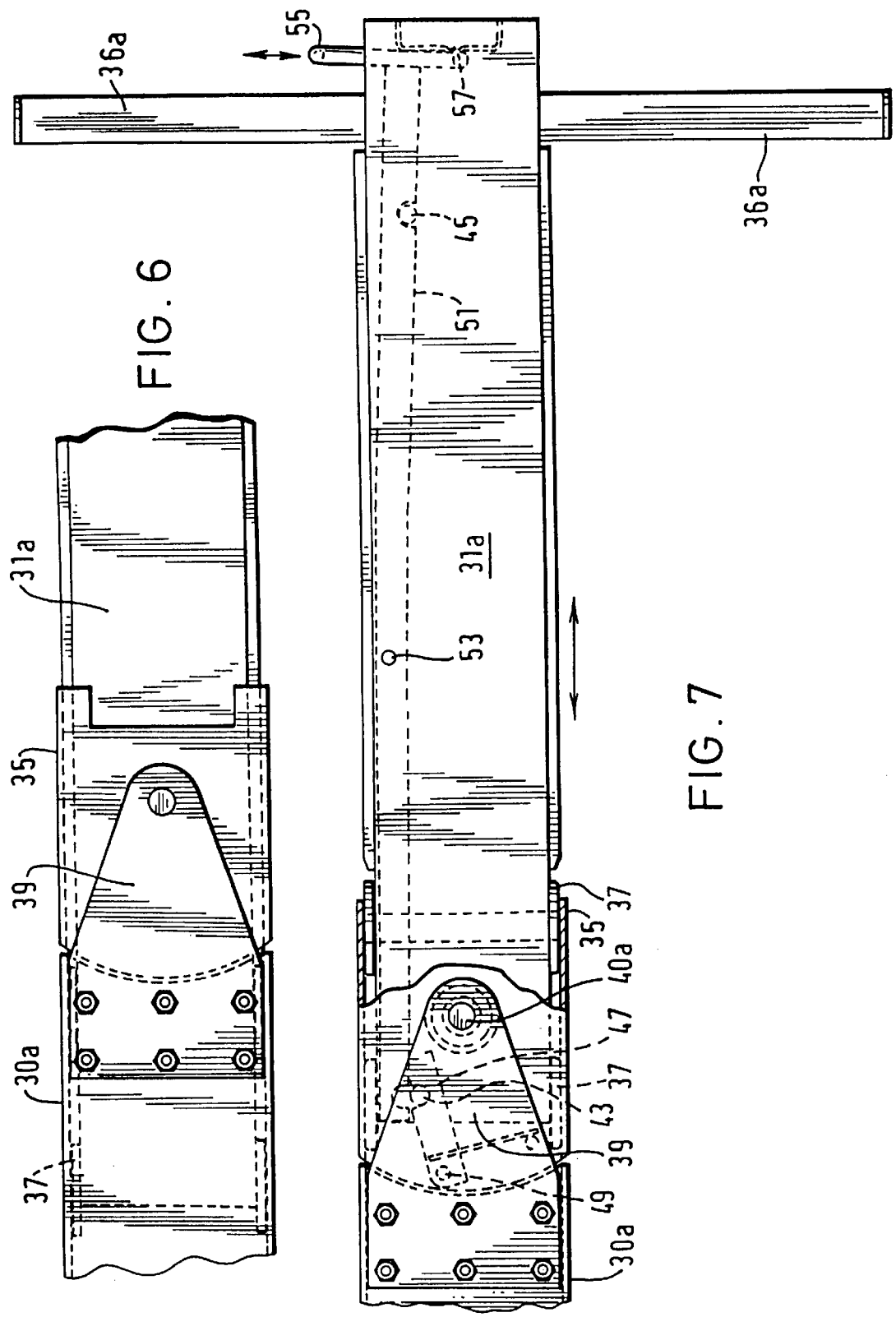

PEDESTRIAN OPERATED MACHINE WITH FOLDAWAY SEAT

This invention relates to a seat assembly for a pedestrian operated machine, and in particular to a self-propelled pedestrian operated machine such as a suction sweeper, provided with such a seat assembly.

The pedestrian areas of many cities and towns are cleaned using self-propelled pedestrian operated suction sweepers, such as the Green Machine (RTM) manufactured by the applicant. This particular machine has a body including a drive motor linked to a pair of drive wheels and handlebar like operator controls at the rear of the machine. A pair of rotary brushes and a suction inlet are provided towards the front of the machine, and a dust bag is provided beneath the rear of the machine. As the machine is primarily intended for cleaning busy pedestrian areas, the machine normally travels at a slow walking pace. However, during less congested periods the machine may move more quickly, but is limited to the walking pace of the operator.

It is among the objects of the present invention to provide an operator support, e.g. a seat assembly for a pedestrian operated machine, and a pedestrian operated machine which if desired may be configured to provide support for the operator, such that the speed of the machine is not limited by the requirement for the operator to walk with the machine.

According to the broadest aspect of the present invention, we provide an operator support assembly for mounting on a pedestrian operated machine, the assembly comprising a frame for attachment to the machine and including a spine, a spine extension telescopically mounted relative to the spine, and an operator support carried by the spine extension. Preferably the operator support is a seat, which is pivotally secured to the spine extension, and moveable between a storage position and an operative position.

Preferably, the spine extension also includes two foot plates on which an operator may rest his feet when he is sitting on the seat when this is in the operative position.

Preferably also, the frame includes a transverse member at its front end from the rear of which the spine extends, this transverse member including two forwardly extending pivot mounts by means of which the frame may be attached, preferably pivotally, to the machine. Preferably, the transverse member also has on each side a rearwardly extending mount or pair of lugs, by means of which one end of a shock absorber may be secured to the frame, the other end being pivotally connectable to a mounting point on the machine.

Preferably, the seat assembly has a visible warning device, such as a light, mounted on its rear.

According to a further aspect of the present invention there is provided a pedestrian operated machine, the machine having: a body including a drive motor, ground engaging drive means and operator controls; and an operator support assembly comprising a telescopic frame movable between a storage configuration, to permit the operator to walk with and operate the machine, and an operative position, permitting operation of the machine from a supported position.

The machine may be a suction sweeper, such as the Green Machine (RTM) manufactured by the applicant. With the operator support in the storage configuration, the sweeper may be used in a conventional manner, moving relatively slowly with the operator walking behind the machine. However, when the area being swept is relatively unobstructed the frame may be telescopically extended so that the support is moved to the operative position, such that the operator may "ride" on the machine and thus move more quickly than would be possible if the operator was walking. The support is also useful when the machine is moving between sites, and may reduce the need for support vehicles to transport the machines from, for example, a storage depot to a town center site where the machine is to be used.

Preferably, the operator support includes a seat which is preferably pivoted between a storage position and a position of use. Most preferably, the operator support also includes a foot support. Preferably, both these components are supported on a spine extension which is telescopically supported in a spine forming part of the frame.

Preferably also, the support assembly is provided with ground engaging support means, typically one or more wheels. Most preferably, the support assembly is pivotally connected about a horizontal axis to the body and the ground engaging support means are articulated to frame. Preferably, when the frame is telescopically extended to its operative position, a vertical pivot is released from a locked up position, to enable the spine extension to pivot about the vertical pivot relative to the spine itself. Where the machine has a pair of drive wheels, this arrangement facilitates steering of the machine without the requirement to provide any complex steering mechanism, as the operator only has to push the operator controls in one direction for the machine to turn in the other direction. Ideally, the link between the operator support and the body allows relatively unrestricted pivoting therebetween, for example up to about 270 degrees movement. To turn sharply, it is therefore possible for the operator to step off the support and turn the machine in less than its own length. This gives exceptionally good maneuverability in the field, and is important in a municipal environment.

Preferably also, the ground engaging support means serves as a support for at least a part of the machine while the operator support assembly is in the storage position. Most preferably, the operator support assembly and the ground engaging support means are telescopically movable between a storage position substantially within the volume of the machine and an operative position to the rear of the machine. In the suction sweeper embodiment of the invention, the ground engaging means may serve as a support for the dust bag, which is often pivotally linked to the machine to facilitate negotiation of curbs and the like and to prevent the weight of the dust bag affecting the balance of the machine. With the operator support assembly in the storage position, the support wheel may be set in a castor mode, but may be fixed in alignment when the support is moved to the operative position.

This and other aspects of the present invention will now be described, by way of example, with reference to the accompanying wings, in which.

Figure 3:
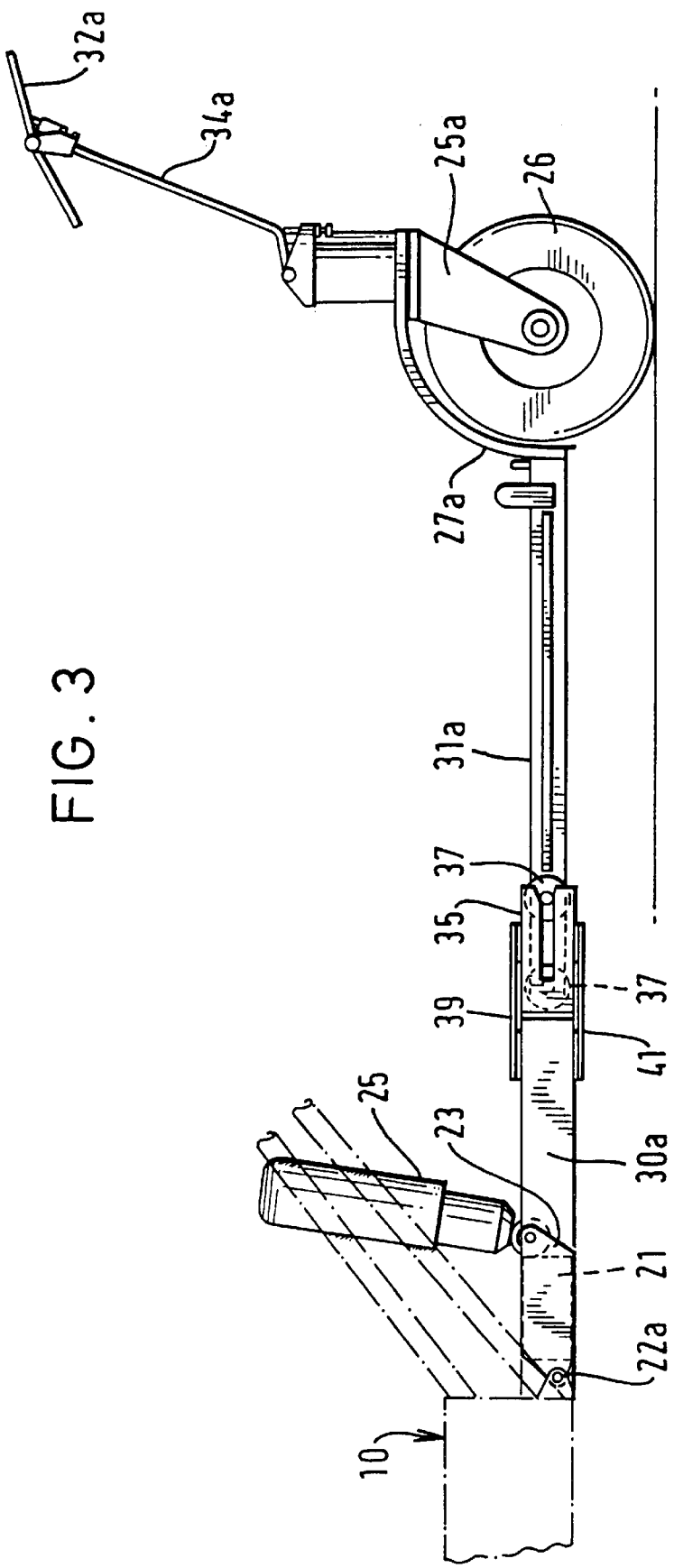
FIG. 3 is a side elevation showing a second preferred embodiment of operator support assembly in its extended, operative position, pivotally attached to the back of a machine.
Figure 4:
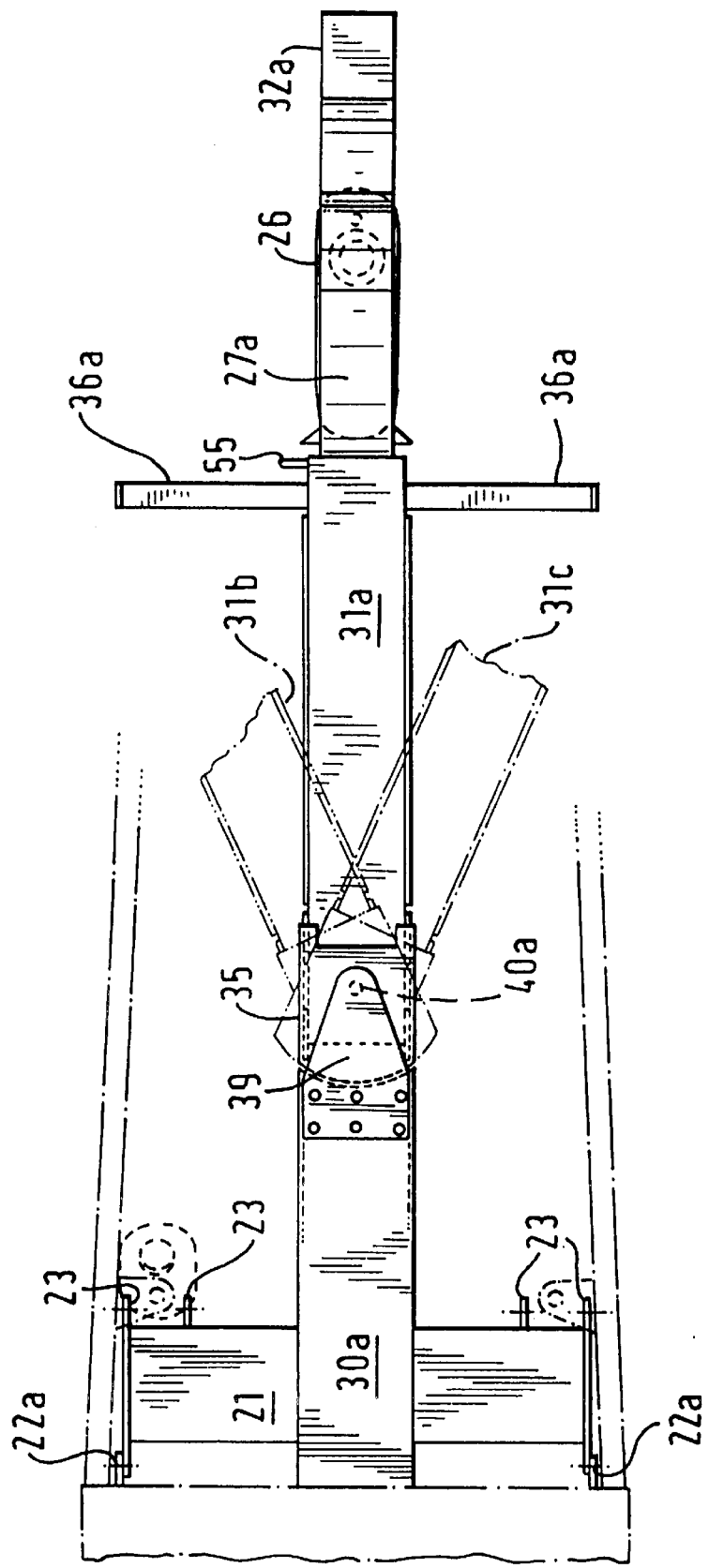
Figure 5:
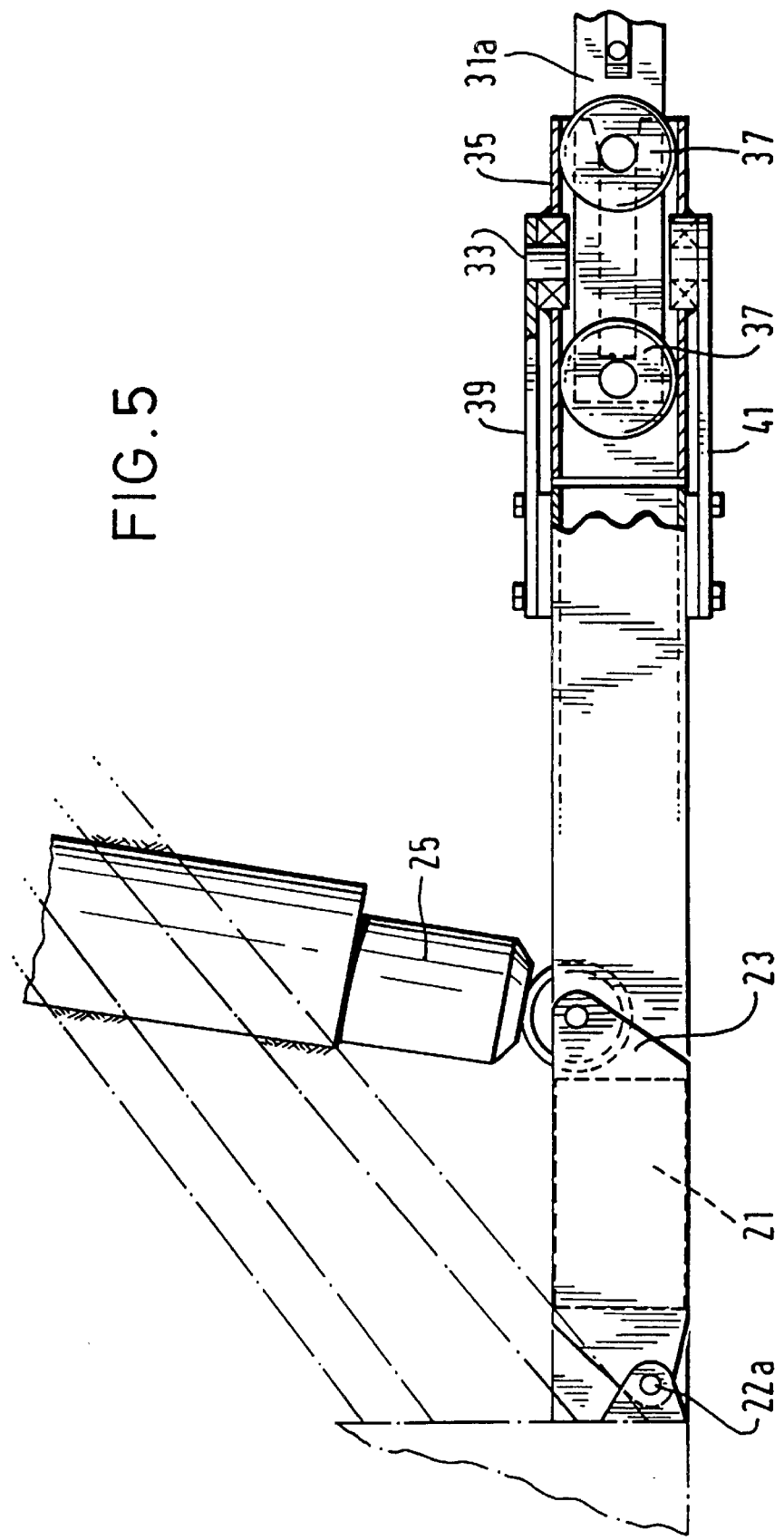
Figure 8:
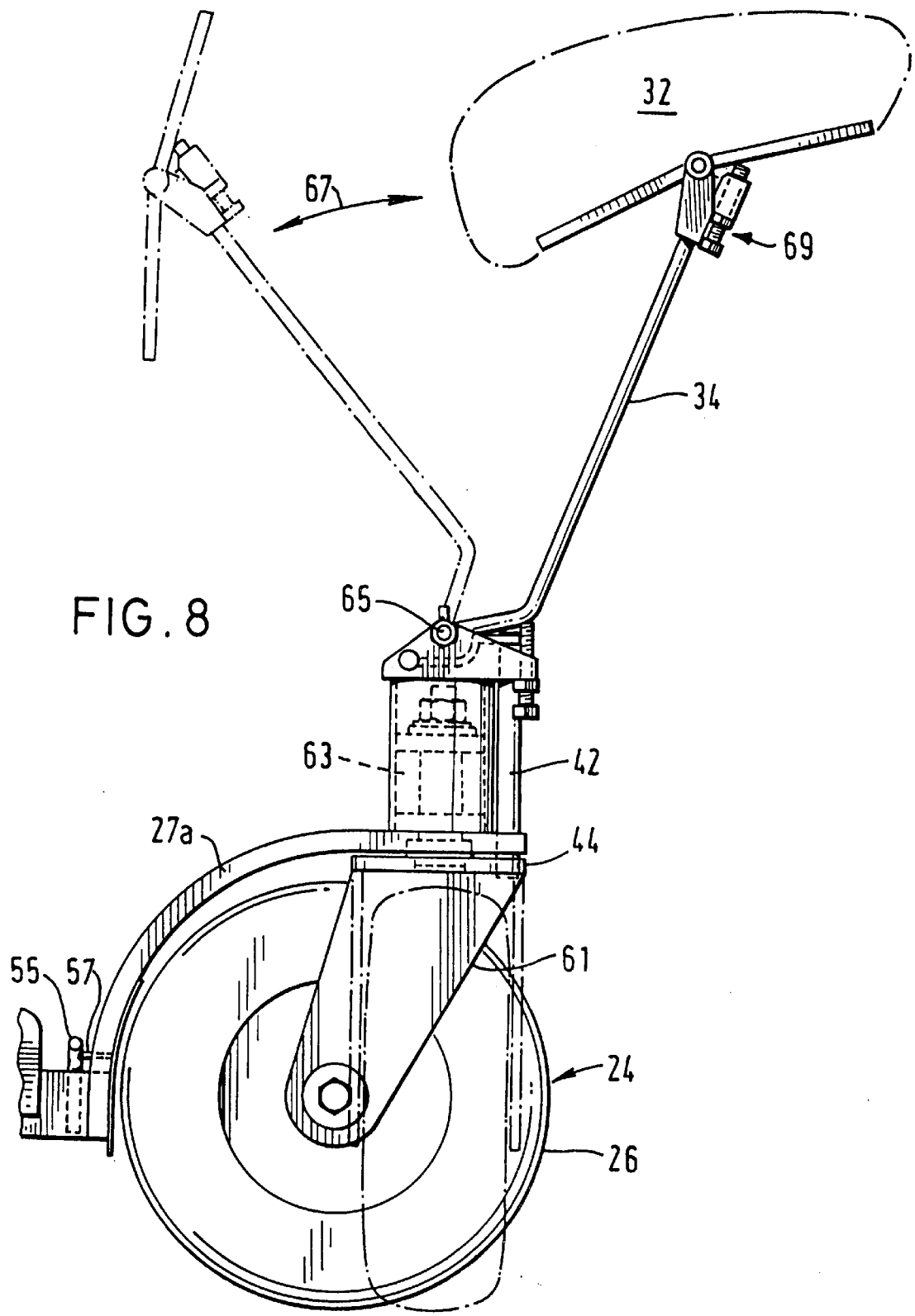
Figure 9:
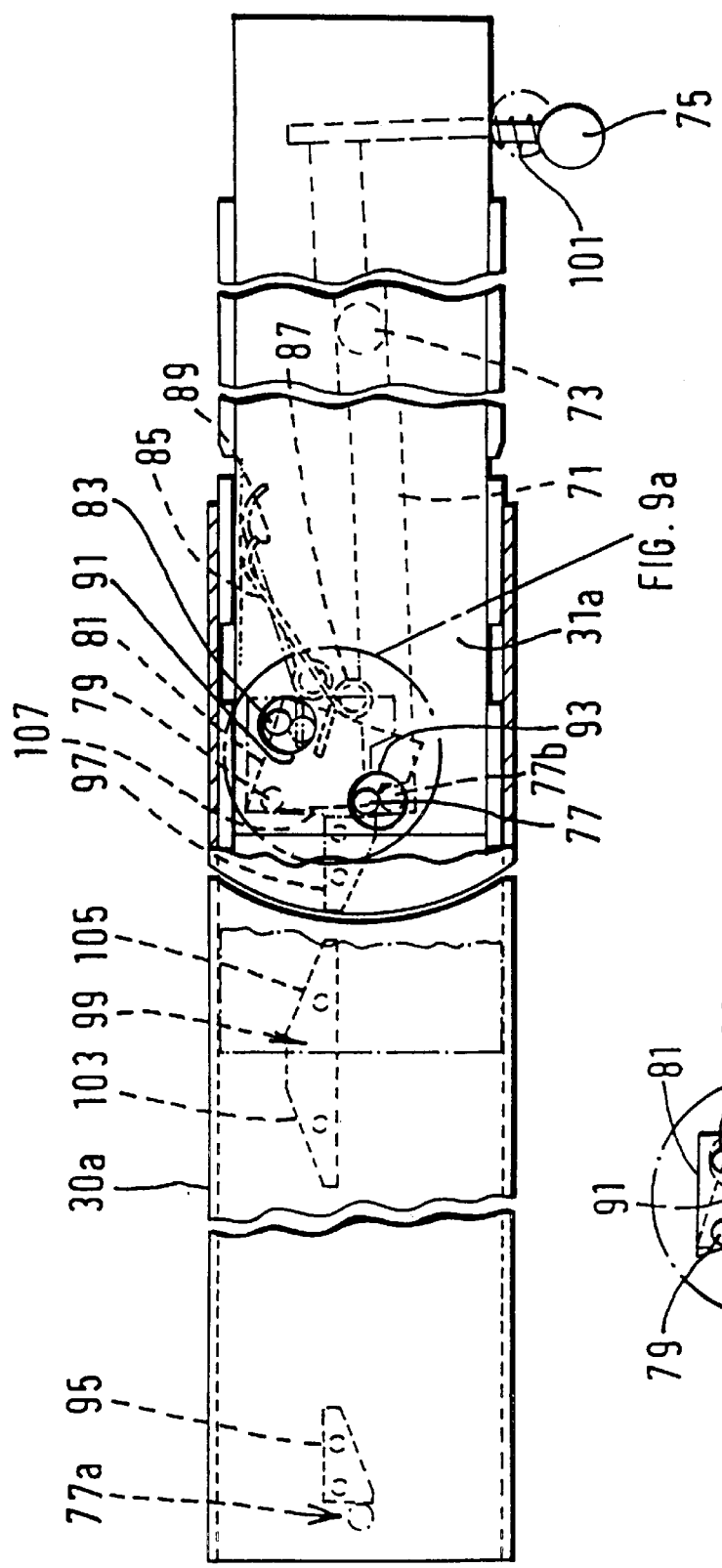
Figure 9A:
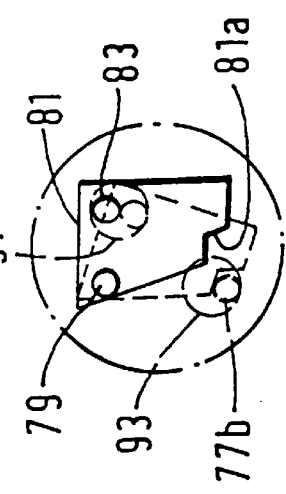

FIG. 4 a plan view of the assembly of FIG. 3;

FIG. 5 is an enlarged view, partly in section, of part of the assembly shown in FIG. 3;

FIG. 6 is an enlarged plan view of part of the assembly shown in FIG. 4, but showing a spine extension in a partly collapse position, midway between a storage position, in which a vertical pivot is locked up and an operative position;

FIG. 7 is a view similar to FIG. 6 but with part broken away and showing the spine extension fully extended in its operative position, in which the vertical pivot is free, and showing one embodiment of latch mechanism;

FIG. 8 is a scrap side elevational view, to an enlarged scale, showing details of an operator's seat;

FIG. 9 is a view, similar to FIG. 7, of an alternative latch mechanism for the spine extension; and FIG. 9a is a scrap view more clearly illustrating the operation of a latch plate.

Figure 1:
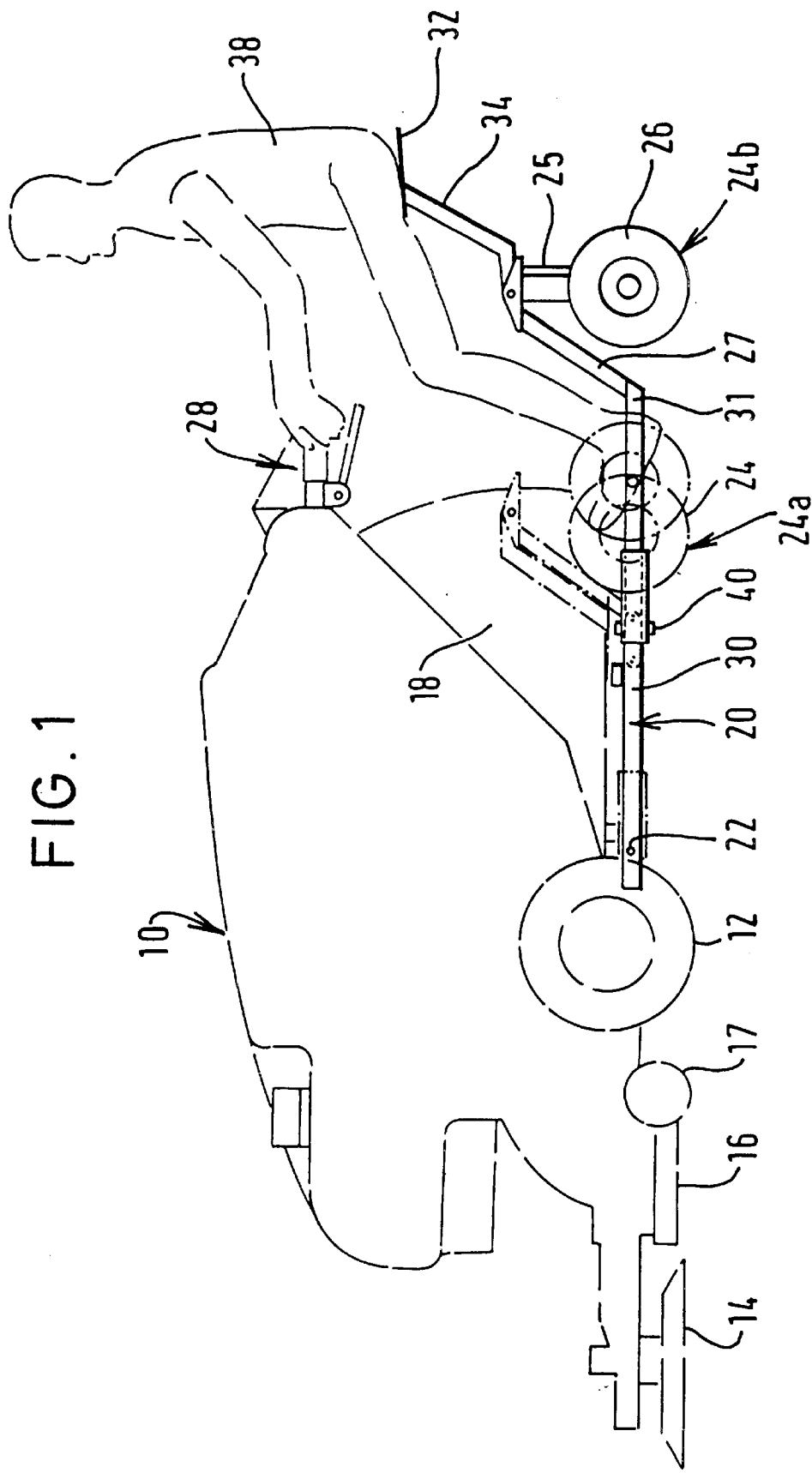
FIG. 1 is a partly schematic side view of a suction sweeping machine fitted with one embodiment of the operator support assembly of the present invention.
Figure 2:
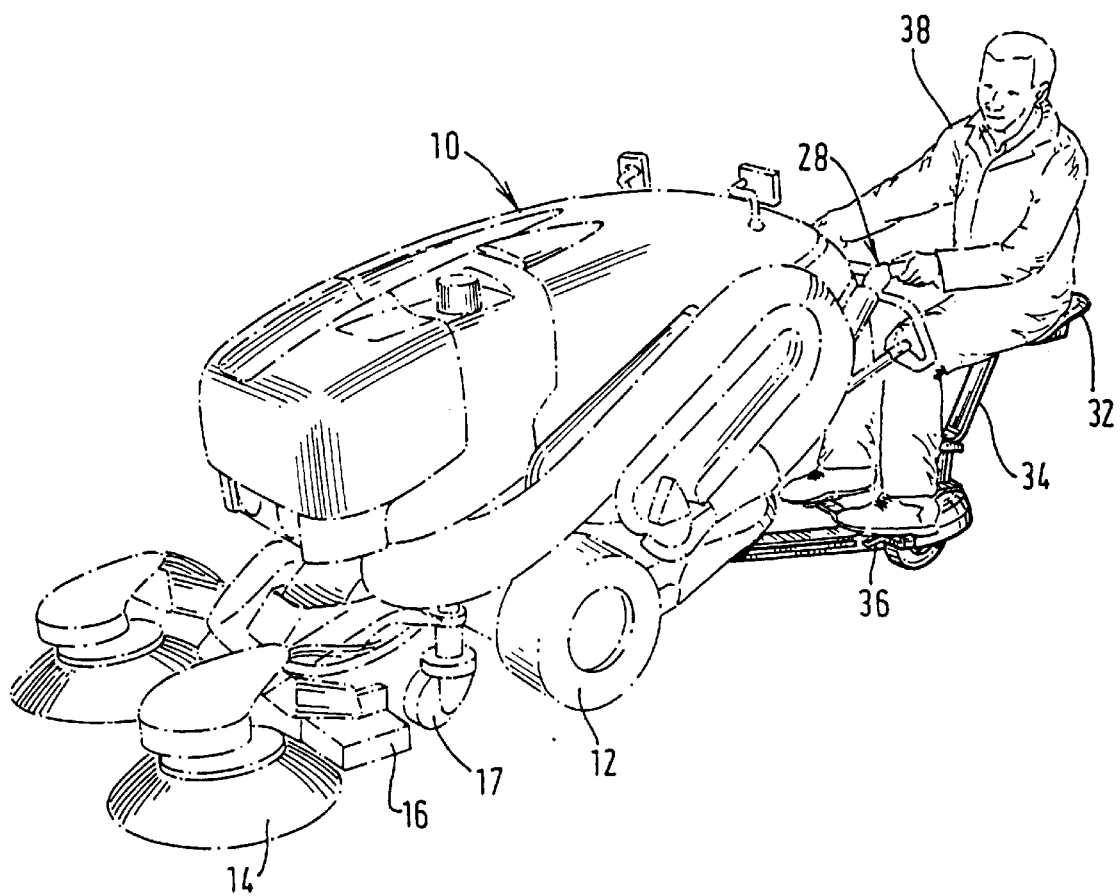
FIG. 2 is a perspective view of the machine of FIG. 1.

Referring to FIGS. 1 and 2 of the drawings, the suction sweeping machine 10 has a body accommodating a motor which drives a suction fan. The motor is linked to a pair of drive wheels 12 and a hydraulic motor for driving rotary brushes 14 at the front of the machine which carry debris to the mouth of a suction intake 16. The height of the brushes 14 and intake 16 is controlled by castors 17. The debris is drawn into the machine and deposited in a dust bag 18 located to the rear of the machine. The dust bag 18 sits upon a tray 20, the front end of which is pivotally mounted on the body about a horizontal transverse axis 22, the rear of the tray 20 being supported by a wheel 24 provided with a pneumatic tire 26. The wheel 24 depends from a bracket 25 fixed to a support arm 27 which extends upwardly and rearwardly from the tray 20. The wheel 24 is mounted such that it may pivot in a similar manner to a castor. The dust bag 18 is supported in this manner such that an operator may negotiate curbs and the like more easily, for example, by lifting the front of the machine 10 to climb a curb, and also such that the weight of debris in the bag 18 does not affect the balance of the machine 10.

The operator controls 28 are provided in a handlebar like arrangement at the rear of the machine, such that the operator may walk behind the machine and steer the machine by simply pulling or pushing on the controls 28.

The machine 10 is used in this configuration when cleaning restricted or congested areas and normally when crossing a road. In less restricted areas and when there is less pedestrian traffic, the operator may reconfigure the machine 10 such that the operator may ride on the machine, as will be described.

The dust bag tray 20 includes a longitudinal spine 30 with the support arm 27 and bracket 25 mounted to the rear end thereof. The spine 30 incorporates a telescopic arrangement which, then released and extended by the operator, allows the wheel 24 to be pulled rearwardly from the first position 24a to a position 24b in which the wheel is spaced from the dust bag 18 on a spine extension member 31. An operator seat 32 and support stalk 34 are pivotally mounted to the bracket 25 above the wheel 24 and when the wheel is moved rearwardly the seat and stalk 32, 34 may be extended from a storage position, lying adjacent the arm 27, to an operative position. The spine extension includes foot rests 36 (see FIG. 2) such that the operator 38 may sit comfortably on the seat 32, holding the controls 28, with his feet on the rests 36. A pivot connection 40 about a vertical axis is provided between the spine 30 and the spine extension 31 such that the wheel and seat 24, 32 may pivot relative to the remainder of the machine 10 when the extension is in its extended position. Thus, the operator 13 may still steer the machine simply by pushing or pulling transversely on the controls 28.

As noted above, when located below the dust bag 10 the wheel 24 may pivot about a vertical axis in a similar manner to a castor. However, it is desirable that the orientation of the wheel is fixed when supporting the operator 38. Accordingly, a suitable locking member is provided and in the preferred embodiment which is shown in FIGS. 3–8, this takes the form of a sprung pin 42 which is normally biassed out of engagement with an apertured plate 44 fixed to the wheel mounting. However, when the operator sits on the seat 32 the lower end of the stalk 34 pushes the pin into the aperture and holds the wheel 24 in the straight-ahead position. The wheel has to be in line to accept the pin. It has been found that the machine is more maneuverable in this mode than with the castor wheel in a trailing mode. Only when the wheel is correctly located can the seat be moved to its position of use. Otherwise, the upwardly projecting pin 42 prevents the seat being moved fully to its position of use.

Referring now to FIGS. 3–8 in which like parts are identified with the same reference numbers as used in FIGS. 1 and 2 and similar parts are identified with the same reference numerals, but with the suffix a, a preferred extendable and foldable seat construction is adapted for pivotal connection to the rear of the suction sweeping machine about two pivot pins 22a which pass through apertures formed in the front end of respective plates attached to the ends of a transverse mounting beam 21 welded to the front of a box section spine beam 30a, in which is telescopically supported a rectangular spine extension beam 31a. Projecting rearwardly from end portions of the beam 21 are respective pairs of spaced, apertured lugs 23 by means of which the lower ends of shock absorbers 25 (the upper ends of which are pivoted to the machine frame) are pivotally connected to the spine 30a. At its rear end, the spine 30a has an upper 39 and a lower 41 pivot plate bolted to it, these plates pivotally supporting, about a vertical pivot 40a, an articulated rear spine portion 35. When the pivot is 'released', this allows the machine to negotiate corners when in 'ride-on' mode, as illustrated schematically at 31b, 31c.

At its front end, the spine extension beam 31a supports two sets of bearing wheels 37, which slide easily within the spine 30a, and are a tight fit within the articulated spine portion 35.

In order to lock the spine extension in its fully retracted position (pedestrian mode) and in its fully extended position (ride-on mode) respectively, two upstanding pegs 43, 45 are provided on the spine extension, which are engaged respectively with a spring loaded pawl 47 pivotally connected to the plate 39 about a vertical pivot 49. The pawl 47 has a notch therein snugly to receive the pegs 43, and is biased into a position so that the notch will engage one of the pegs 43, 45 when the spine extension is in one of its extreme positions as shown in FIG. 7. A release lever 51 is pivotally supported at 53 on the spine extension 31a, the lever having a projecting operating bar 55, an inner end of which engages a latch device as shown at 57 in FIG. 7. When it is desired to release the locking pawl 47 from the peg 43, the lever 51 is rocked anti-clockwise as shown in FIG. 7, moving the front end of the lever 51 into engagement with the pawl 47, so as to rock it, against its spring bias, about the pivot 49, so that the peg 43 is no longer engaged in the notch in the pawl (there is a notch in the front end of the lever 51 to accept the peg 43 when the pawl is being released). As can be seen from FIG. 7, when the peg 45 is in engagement with the notch in the pawl 47 to hold the spine extension 31a in its fully retracted position, the lever will first have to be rocked anti-clockwise to move bar to the other side of latch device 57, and to release the pawl, the lever then has to be rocked clockwise to its illustrated position.

An alternative design of locking mechanism for locking the spine extension in its fully retracted and fully extended positions is shown in FIG. 9 and the scrap view FIG. 9a shown in dotted lines in FIG. 9. This design is located wholly within the spine 30a and spine extension 31a except for the end of the release lever.

In this embodiment, the external lever 51 is replaced by an internal lever 71 which is pivotally supported on the spine extension beam 31a about a pivot point 73. At one end of the lever 71 there is a knob 75 and at its opposite end there is an upstanding dowel 77. Also supported on the beam 31a about a pivot point 79 is a latch plate 81 which is located above the lever 71 and has an upstanding latch plate dowel 83 on its upper face and a latching notch 81a in one corner (see FIG. 9a). The latch plate 81 is biased to its illustrated (broken line) position by a hairpin spring 85 having at least one coil 87 therein, one end of the spring 85 being located in an aperture in the latch plate 81 and the opposite end of the spring 85 terminating in a curved portion 89 which bears loosely against the internal face of a side wall of the beam 31a. An alternative to the spring 85 could be used.

A clearance aperture 91 is formed in the upper wall of the beam 31a to accommodate the latch plate dowel 83 and a second clearance aperture 93 is formed in the upper wall of the beam 31a to accommodate the dowel 77 on the end of the operating lever 71.

On the spine 30a there is a first striker and locking wedge 95 for holding the spine extension in its fully retracted position within the spine 30a, a second locking and striker wedge 97 for holding the spine extension beam 31a in its fully extended position, and a latch plate release ramp 99, the latter cooperating with the dowel 83 and the two wedges cooperating with the dowel 77.

When the beam 31a is in its fully retracted position, the dowel 77 on the end of the lever 71 engages behind the straight face of the wedge 95 as shown at 77a. To release the beam from this position the knob 75 is pushed fully in against the bias of a spring 101, thus rocking the lever 71 anti-clockwise and moving the dowel 77 out of the influence of the wedge 95, whereupon the beam 31a can be extended. Rocking of the lever 71 in this fashion will allow the latch plate 81 to swing to its broken line position under the influence of the spring 85 and it will then hold the base 71 in this position, due to dowel 77 engaging in recess 81a as shown at 77b in FIG. 9a. Pulling the beam 31a out to its extended position will cause the latch plate dowel 83 to strike camming surface 103 on ramp 99 causing the latch plate 81 to pivot anti-clockwise to its full line position which in turn will allow the release lever 71 to pivot clockwise under the influence of spring 101. As the beam 31a moves towards its fully extended position, the dowel 77 will strike the camming surface on the wedge 97, run up this surface and then spring behind the straight face on the wedge 97 due to the action of spring 101, thus locking the beam 31a in its fully extended position.

To return the beam 31a and hence the seat to its fully retracted position, the knob 75 is pushed fully in against the action of spring 101, thus moving dowel 77 from behind the straight face of wedge 97 and allowing latch plate 81 to swing clockwise to its broken line position, thus latching dowel 77 in the disengaged position 77b. The beam 31a can then be pushed to the left as shown in FIG. 9 which will cause the latch lever dowel 83 to strike camming surface 105 on the ramp 99, thus causing the latch plate to return to its full line position and allowing the release lever dowel 77 which is influenced by the spring 101 to take up a locking position 79a behind the wedge 95 after the dowel 77 has first run over the inclined camming surface as it passes the wedge. Once behind the straight face of the wedge 95, the beam 31a will be locked in its fully retracted position.

As is apparent from FIG. 8, the castor wheel 26 is of traditional design, supported for rotation on a fork 61 incorporating the apertured plate 44, the plate and fork being pivotally supported for rotation about a vertical axis in known manner on a spring steel support arm 27a by a bearing 63. The stalk 34 and seat 32 can be pivoted about a horizontal pivot 65 between an operative position and a folded position as shown generally at 67 in FIG. 8. A stud 69 is provided to adjust the rake of seat 32 in known manner, and two further studs 70 are provided to adjust the rake of the stalk 34.

Even with the seat and wheel 32, 24 articulated to the body, the turning circle of the machine in the support configuration is relatively small; to turn the machine 10 within a restricted space, the operator 38 simply steps down from the seat 32 and turns the machine 10 as if the machine 10 was operating in the pedestrian mode. This is made possible by the pivot connection 40 or 40a, which allows almost 270 degrees of movement such that, with the operator off the seat 32, the machine 10 may be turned within its own length.

When operating in the pedestrian mode, the speed of travel of the machine 10 is limited by the speed at which the operator can walk, typically around three miles per hour. However, with the operator 38 supported on the seat 32 the machine may travel more quickly and thus sweep a larger area within a given time period.

An emergency stop bar (or button or the like) of generally known construction is provided on or adjacent the operator controls (handlebars) 28 in the event that the operator drives into an obstacle and forgets to let go on a main drive lever. This is important to safeguard both the public and the operator of the machine.

The seat 32 and foot rests 36 may be so constructed that an operator will be part standing and part sitting on the operative support when the latter is deployed and the machine operated in "ride-on" mode.

It will be clear to those of skill in the art that the above-described embodiments are merely exemplary of the present invention, and that various modifications and improvements may be made thereto without departing from the scope of the invention. For example, although the operator support is shown as a folding seat assembly, it is envisaged that it could comprise a wheeled platform.

We claim:

1. An operator support assembly for use with a pedestrian operable machine, the assembly comprising: a frame for attachment to the machine, the frame including a spine and a spine extension telescopically mounted relative to the spine; an operator support pivotally connected to the spine extension and moveable between a storage position and an operative position, and the spine extension being moveable relative to the spine between a retracted storage position and an extended position of use; and ground engaging support means carried by the frame, a front of the ground engaging support means being closer to the spine than a rear of the ground engaging support means; wherein said operator support in the storage position is wholly in front of said front of the ground engaging support means.

2. The assembly according to claim 1 wherein the operator support is a seat.

3. The assembly according to claim 2 wherein the seat is pivotally connected to a support stalk.

4. The assembly according to claim 3 wherein the stalk is pivotally mounted on the spine extension for movement between a folded position and an operative position.

5. The assembly according to claim 1 including a transverse and horizontal pivot axis about which the assembly may pivot up and down relative to the machine.

6. The assembly according to claim 5 wherein the frame includes a transverse member at its front end from the rear of which the spine extends, this transverse member including two forwardly extending pivot mounts defining the pivot axis and by means of which the frame may be pivotally attached to the machine.

7. The assembly according to claim 6 wherein the transverse member also has on each side a rearwardly extending mount or pair of lugs, by means of which one end of a shock absorber is adapted to be secured to the frame, while a second end of a shock absorber is adapted to be pivotally connected to a mounting point on the machine.

8. The assembly according to claim 7 and which has a visible warning device mounted on its rear.

9. The assembly according to claim 8 wherein the visible warning device is a light.

10. The assembly according to claim 1 wherein the spine is formed of a box section in which the spine extension is slidable, the box section comprising a main portion and a rear portion pivotally attached to the main portion for pivotal movement about a vertical axis, the spine extension, when in its extended position being located just within the rear portion, thereby allowing pivotal movement between the two portions, the spine extension, when in its fully retracted position, being located within both portions, thereby locking up said pivotal movement.

11. The assembly according to claim 1 further comprising a pivotal connection connecting the spine extension to the spine.

12. The assembly according to claim 11 wherein the pivotal connection is blocked from pivotal movement in the retracted storage position and is free to pivot in the extended position of use.

13. A pedestrian operable machine having: a body including a drive motor, ground engaging drive means, and operator controls; the machine further having an operator support assembly comprising a telescopic frame movable between retracted and extended positions, ground engaging support means carried by the frame, and an operator support pivotally supported on the frame, the operator support assembly being convertible between a storage configuration, in which the frame is in its retracted position thus permitting the operator to walk with and operate the machine, and an operative configuration, in which the frame is in its extended position, permitting the operator to operate the machine from a supported position, wherein, when the frame is in the retracted position, the assembly is located within an area encompassed by a downward vertical projection of a top periphery of the body.

14. The machine according to claim 13 wherein the operator support comprises a seat which is pivoted between a storage position and a position of use.

15. The machine according to claim 14 wherein the seat is supported on a spine extension which is telescopically supported in a spine, the spine and spine extension forming part of the frame, in which, when the frame is telescopically extended to its operative position, a vertical pivot is released from a locked up position, to enable the spine extension to pivot about the vertical pivot relative to the spine.

16. The machine according to claim 14 wherein the seat is supported on a spine extension which is telescopically supported in a spine, the spine and spine extension forming part of the frame, the machine further including locking means to latch the spine extension in its fully extended and fully retracted positions, wherein the locking means comprises a pair of first members carried by the spine and a second member carried by the spine extension, the second member being engageable with one of the first members when the spine extension is in its fully retracted position and being engageable with the other of the first members when the spine extension is in its fully extended position.

17. The machine according to claim 16 wherein the second member comprises a dowel projecting from a front end of a release lever pivotally supported on the spine extension, there being a latching plate associated with the release lever which is also pivotally supported on the spine extension, the latching plate carrying a further dowel which is engageable with a cam carried by the spine.

18. The machine according to claim 17 wherein the latching plate is spring biased into a position preventing the lever from moving to a locking position, the latching plate being movable against its spring bias by movement of the spine extension between its retracted and extended positions.

19. The machine according to claim 18 wherein the locking means is located wholly within the spine and spine extension.

20. The machine according to claim 19 wherein the operator support assembly is pivotally connected about a horizontal axis to the body.

21. The machine according to claim 20 wherein the ground engaging support means are articulated to the frame.

22. The machine according to claim 14 wherein the seat is pivotally connected to a stalk.

23. The machine according to claim 22 wherein the stalk is pivotally supported on the frame.

24. The machine according to claim 13 wherein the ground engaging means serves as a support for a dust bag, which is pivotally linked to the machine to facilitate negotiation of curbs and the like and to prevent the weight of the dust bag affecting the balance of the machine.

25. The machine according to claim 13 wherein the ground engaging support means is a castor wheel and wherein, with the operator support assembly in the storage configuration, the wheel may be set in a castor mode, but has to be fixed in alignment when the support assembly is moved to the operative position.

26. The machine according to claim 25 wherein the castor wheel is supported on a fork incorporating an apertured plate and supported for rotation about a vertical axis, there being a spring loaded pin associated with the operator support which is engageable in an aperture in the plate when an operator is on the operator support, to enable the castor wheel to be fixed in fore-and-aft alignment.

27. The machine according to claim 13 wherein the operator support assembly is pivotally connected about a horizontal axis to the body, the horizontal axis being parallel to an axis of rotation of the ground engaging support means when the spine extension is not pivoted with respect to the spine.

28. An operator support assembly for use with a pedestrian operable machine, the assembly comprising: a frame for attachment to the machine, the frame including a spine and a spine extension telescopically and pivotally connected to the spine, the spine extension being movable between a retracted storage position wherein the spine extension is not pivotal with respect to the spine and an extended position of use wherein the spine extension is pivotal with respect to the spine; a seat pivotally connected to the spine extension; and ground engaging support means carried by the frame.

29. An operator support assembly for use with a pedestrian operable machine, the assembly comprising: a frame for attachment to the machine, the frame including a spine and a spine extension telescopically mounted relative to the spine; an operator support pivotally connected to the spine extension, and the spine extension being moveable between a retracted storage position and an extended position of use; ground engaging support means carried by the frame; and a transverse and horizontal pivot axis about which the assembly may pivot up and down relative to the machine.

30. An operator support assembly for use with a pedestrian operable machine, the assembly comprising: a frame for attachment to the machine, the frame including a spine and a spine extension telescopically mounted relative to the spine; an operator support pivotally connected to the spine extension, and the spine extension being moveable between a retracted storage position and an extended position of use; ground engaging support means carried by the frame; wherein said ground engaging support means comprises a castor wheel.

31. A pedestrian operable machine having a front and a rear, the machine comprising: a body comprising a drive motor, ground engaging drive means, and operator controls including a handlebar arrangement having a frontmost portion closer to the front of the machine than a rearmost portion of the handlebar arrangement, a rear of the body defined by a rearmost portion of the handlebar arrangement; the machine further having an operator support assembly comprising: a frame for attachment to the machine, the frame including a spine and a spine extension telescopically mounted relative to the spine; an operator support pivotally connected to the spine extension and movable between a storage position and an operative position, and the spine extension being moveable between a retracted storage position and an extended position of use, and ground engaging support means carried by the frame, wherein the assembly is adapted to support an operator when the operator support is in the operative position and the spine extension is in the extended position of use and further wherein, when the spine extension is in the retracted storage position, the operator support is located wholly in front of the frontmost portion of the handlebar arrangement.

32. A pedestrian operable machine having a front and a rear, the machine including: a body including a drive motor, ground engaging drive means, and operator controls, the body having a front and a rear, a rearmost part of the body defined by a rearmost part of the operator controls; the machine further having an operator support assembly, the assembly including a frame for attachment to the machine, the frame including a spine and a spine extension telescopically mounted relative to the spine; an operator support carried by the spine extension, and the spine extension being moveable between a retracted storage position and an extended position of use; and ground engaging support means carried by the frame; wherein the ground engaging support means is located wholly forwardly of the rearmost part of the operator controls in the retracted storage position of the spine extension and wherein the ground engaging support means is located wholly rearwardly of the rearmost part of the operator controls in the extended position of the spine extension.

33. A pedestrian operable machine having a front and a rear, the machine comprising: a body comprising a drive motor, ground engaging drive means, and operator controls including a handlebar arrangement, a rear of the body being defined by a rearmost portion of the handlebar arrangement; the machine further having an operator support assembly comprising a telescopic frame movable between retracted and extended positions and an operator support carried by the frame, the operator support assembly being convertible between a storage configuration, in which the frame is in its retracted position thus permitting the operator to walk with and operate the machine, and an operative configuration, in which the frame is in its extended position, permitting the operator to operate the machine from a supported position, the rearmost portion of the handlebar arrangement defining the rear of the machine when said assembly is in its storage configuration, there being ground engaging support means carried by the frame.

34. A pedestrian operable machine having: a body including a drive motor, ground engaging drive means; operator controls; and an operator support assembly comprising a telescopic frame movable between retracted and extended positions and an operator support pivotally supported on the frame, the operator support assembly being convertible between a storage configuration, in which the frame is in its retracted position thus permitting the operator to walk with and operate the machine, and an operative configuration, in which the frame is in its extended position, permitting the operator to operate the machine from a supported position, wherein said frame supports ground engaging means, said ground engaging means comprising a castor wheel.

35. The machine of claim 34, wherein a rearward portion of the operator controls defines a rearwardmost portion of the body, and wherein said operator support assembly is a seat, and wherein the seat, when in its storage configuration, is located wholly forwardly of said castor wheel, even when said frame is in its retracted position.

* * * * *